United States Patent [19]

McLaughlin et al.

[11] 4,191,857
[45] Mar. 4, 1980

[54] DIGITAL TRUNK SUPERVISORY DECODER MULTIPLEXOR FOR GROUND START OR E&M SIGNALLING ON A COMMON T1 SPAN

[75] Inventors: Donald W. McLaughlin, Naperville; Julius Jusinskas, Jr., Glen Ellyn, both of Ill.

[73] Assignee: GTE Automatic Electric Laboratories Incorporated, Northlake, Ill.

[21] Appl. No.: 946,890

[22] Filed: Sep. 28, 1978

[51] Int. Cl.² ............................................. H04J 3/12
[52] U.S. Cl. ........................... 179/15 BY; 179/15 AT
[58] Field of Search ........ 179/15 BY, 15 AT, 15 AQ, 179/18 FC

[56] References Cited

U.S. PATENT DOCUMENTS

| 3,673,330 | 6/1972 | Suntop | 179/15 BY |
| 3,718,767 | 2/1973 | Ellis | 179/15 BY |
| 4,007,334 | 2/1977 | McDonald | 179/15 BY |

Primary Examiner—David L. Stewart
Attorney, Agent, or Firm—Robert J. Black; Charles A. Doktycz

[57] ABSTRACT

Digital Carrier Trunks connected via a supervisory decoding and multiplexing logic to an electronic digital PABX. The circuit is arranged to receive or transmit the supervisory signal in either the "Ground Start", E&M modes or a combination of both in either the D2 or D3 signalling format over a T1 carrier span without converting to the analog signal form.

7 Claims, 10 Drawing Figures

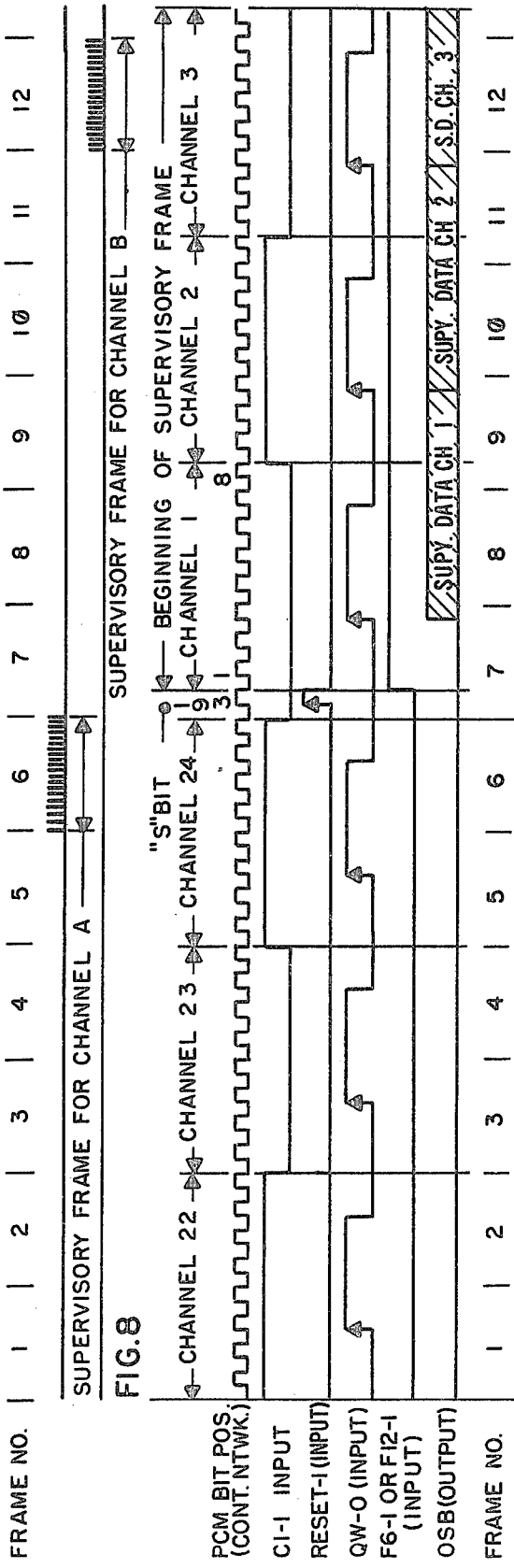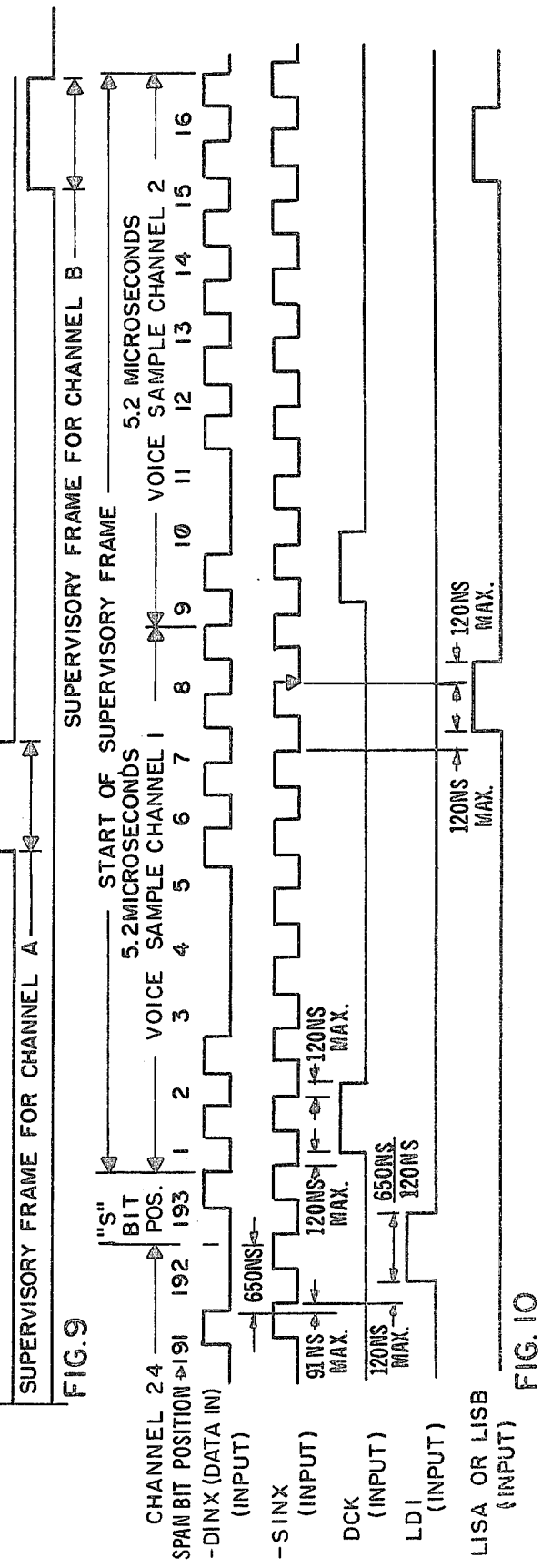

DIGITAL TRUNK SUPERVISORY DECODER MULTIPLEXOR FOR GROUND START OR E&M SIGNALLING ON A COMMON T1 SPAN

BACKGROUND OF THE INVENTION

1. Field of the Invention

This invention relates to pulse code modulation telephone switching systems generally and more particularly, to an arrangement for flexibly intermixing digital trunks, connected to the system via a T1 carrier span, having either "Ground Start" or E&M Signalling.

2. Description of the Prior Art

Private automatic branch telephone exchanges (PABX's) function as centralized switching systems. They provide connection between a number of locally connected subscriber telephone lines with associated telephone apparatus and one or more trunk circuits connecting the private automatic branch exchange to one or more distant central offices.

Until very recent times private automatic branch exchanges (PABX's) have provided switching between lines and trunks on a space divided basis. That is, switches of either an electro-mechanical or electronic configuration have provided selective paths through the switching system to interconnect lines to each other or to trunk circuits serving the PABX. In such systems, the signals transmitted through the PABX were generally of an analog nature. In the situation where a line or a trunk circuit utilizing digital techniques such as pulse code modulation was employed, interface providing analog to digital and digital to analog conversion circuitry was a necessity.

More recently a new generation of PABX systems employing time division switching have been provided. Some such systems as the "Dimension" PABX manufactured by Western Electric Company have provided time division switching of analog signals. Other more recent developments in PABX systems have provided time division switching of pulse code modulated signals. Systems of this type have been manufactured by GTE Automatic Electric Company and designated GTD 120, GTD 1000 and GTD 4600. In such systems as the GTD series, analog to digital, digital to analog interfaces have been provided between the lines and trunks and the time division switching system.

To effect greater economies in transmission equipment more extensive use has been made in recent years of digital transmission equipment. Of particular wide acceptance has been the so called T1 type carrier systems which employ pulse code modulation (PCM) to provide a number of multiplexed signal paths over a single transmission facility such arrangements are currently in use primarily between telephone central offices. To date little utilization of such economies has taken place in transmission facilities between central offices and private automatic branch exchanges. The state of the art and time division switching systems employing pulse code modulated signals as the transmission format is exemplified by such systems as the aforementioned GTD 120 the operation of which is described in U.S. Pat. No. 4,007,338 issued to D. W. McLaughlin on Feb. 8, 1977. The use of two one-way lines for signalling in the D2 or D3 PCM type format is discussed in the article "Second Generation Toll Quality PCM Carrier Terminal" by L. Dean Crawford in the April, 1972 issue of the Automatic Electric Technical Journal. A channel bank unit of the type employed and as described above is manufactured by GTE Lenkurt Incorporated and designated the 9002A channel bank.

Accordingly, it is the primary object of this invention to provide facilities in a private branch exchange for trunk circuits connected via a T1 span line and employing pulse code modulation without the introduction of channel bank equipment and to be able to extract and insert the supervisory information necessary for the control of the trunks from and into the T1 span format.

SUMMARY OF THE INVENTION

The data incoming on the span is bipolar and requires a span interface circuit (SIL) to interface to the physical span and convert the incoming bipolar stream of pulses to an unipolar stream of pulses. It does this and provides the signal DINX which is "Data IN". It also creates a data strobe to allow a safe time to monitor the DINX bits called SINX which is "Strobe IN". The DINX signal can then be strobed with the SINX signal and the PCM code to obtain the A and B signalling bits and the S bit.

The frame detector circuit (FDC) monitors these together to find the S bit. Once it is known which bit is the S bit all other bits are known. The frame detector then provides the information to the line compensator circuit (LCM) to enable the correct storage of the PCM bits for 24 channels, and information to the trunk information store (T1S) to enable the correct storage of the A and B bits for 24 channels. The line compensator circuit (LCM) then stores two frames of PCM data in a buffer using the signal (DINX) and the indication of "load data in" (LDI) from the frame detector circuit. The T1 Buffer (T1B) can then request the LCM to forward the signal "send channel zero" (SCO) and the PCM codes will be provided. Note that the GTD-120 system operates from its own clock while the span is not only some fixed phase delay from it but, also that the delay can vary due to thermal as well as other effects. The line compensator LCM then must synchronize to the span data (DINX) using the LDI signal indication from the FDC and, also synchronize in outputting data (PCM Code) to the T1B. Thus, it can compensate for span variations, jitter or thermal drift. This compensation is achieved by the use of two frames of buffering.

The T1B has a one frame buffer. It contains 24 channels of PCM coded data in eight-bit words which are sequentially written corresponding to the span channel's data. However, the reading is random in that the order of extraction depends on the random channel assignment in the GTD-120 network. This read address is derived by monitoring the output of the network channel memory (CH) looking for trunk identities. This address used in conjunction with the sensing of the absence of GTD-120 analog trunk circuits, indicates when digital trunk PCM is required to be extracted from the incoming T1 buffer and sent to the GTD-120 Information Memory (I).

The loading of this PCM code during network time slots will result in the outputting of PCM code due to the "time switching" operation of the network. This PCM code will be sent to the outgoing T1 buffer to be stored. It will again be a function of the trunk identity and absence of the associated analog trunk. The PCM code is stored in the outgoing T1 buffer to be later serially read out; to be sent to the span interface SIL and combined with the outgoing A&B bits (OSB) and S bit. All of which will be combined in the span interface circuit SIL; first to a serial data stream out (DOTX) and finally converted to bipolar. The distant channel bank will sync to the S bit and extract the PCM and signalling data bits.

The frame detector circuit FDC sends information to the T1 supervisory circuit T1S to extract the incoming A and B signalling bits from the DINX data stream. This is via the signal LDI, which indicates the beginning of a frame (clear to the counter) and the digit check signal "DCK" which occurs every channel and clocks the incoming channel counter to generate a write address. The load incoming supervisory Bit A (LISA) and B (LISB) signals are used to write the associated DINX A or B bit into the A or B buffer, respectively.

The reading of this data is dependent on the CPU trunk scan program. This program will asynchronously request a trunk status by outputting the trunk address. This address will be converted to an address of zero through 23 by the T1 supervisory circuit T1S and the corresponding A and B bits will be extracted and converted to the analog trunk data format by the logic and data there located for the CPU to read. When the CPU decides to seize or pulse a trunk, it will again output the analog trunk identity which is converted to an address from zero through 23, and two data bits in the supervisory circuit T1S. The T1 supervisory circuit T1S wil write these into the respective digital trunk A and B outgoing supervisory buffers. These operations only occur if the T1 supervisory circuit T1S has sensed the absence of the analog trunks. The outgoing A and B bits are available to be sent sequentially to the T1 supervisory circuit SIL. The outgoing span data is run from the T1 buffer circuit T1B counter which in turn is a slave to the GTD-120 network time slot counter. The outgoing S bit is created by the T1B 12 frame counter being decoded to generate the correct pattern. The T1B counter provides the channel counter, frame 6 and frame 12 indications to allow for correct PCM bits and A&B supervisory bits to be combined in the span interface circuit SIL to give proper D2 or D3 format. This combined data will then be sent to the distant end office.

BRIEF DESCRIPTION OF THE DRAWINGS

FIGS. 6-10 are pulse and timing charts illustrating various clock and timing pulses of the system.

DESCRIPTION OF THE PREFERRED EMBODIMENT

Figure 1:
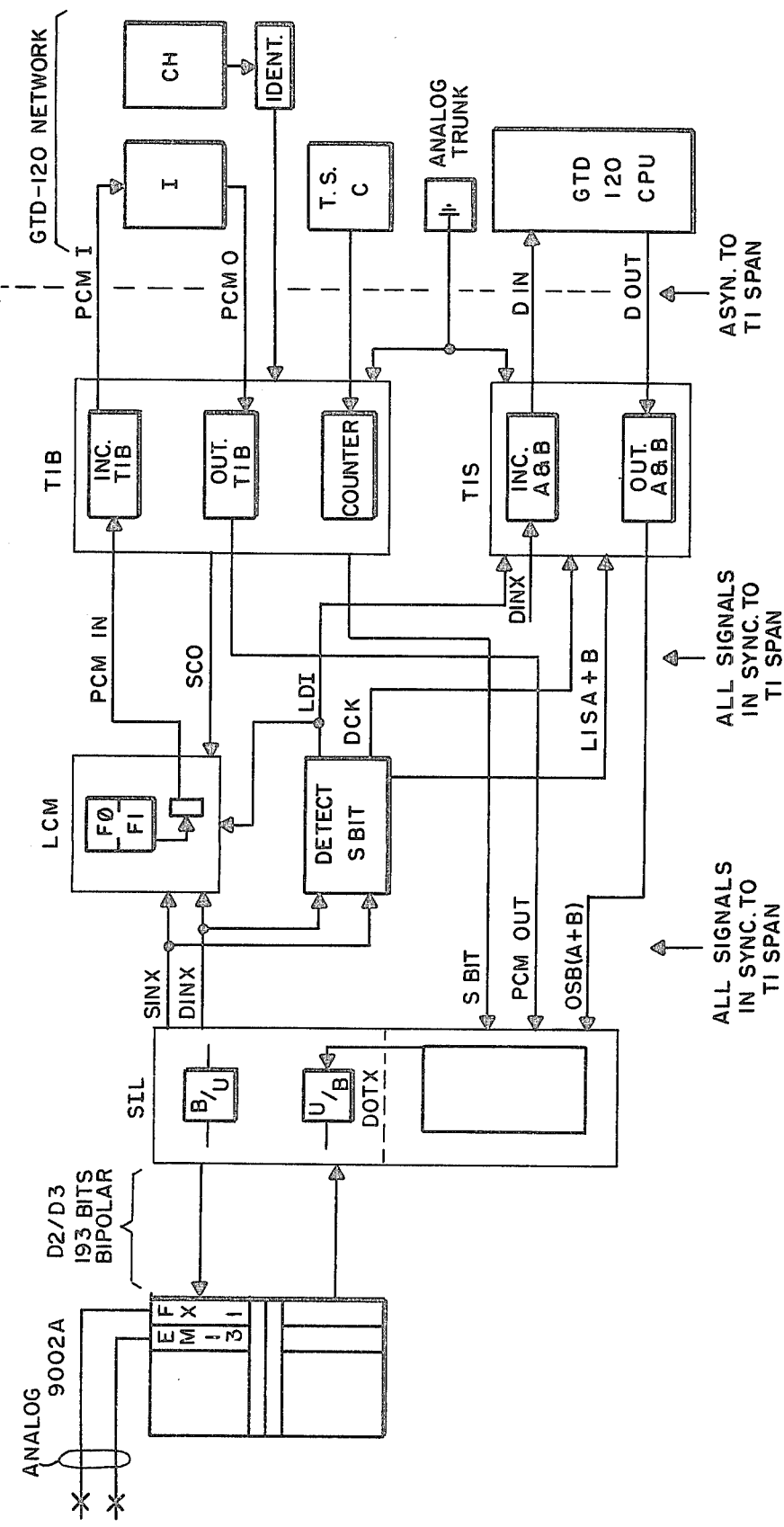
FIG. 1 is a schematic block diagram of the trunk interface of an electronic pulse code modulated switching exchange embodying the principles of the present invention.

The invention is shown in general terms in FIG. 1. Basically the invention can connect a line in the PABX to some distant subscriber or even two distant subscribers. The second case will be described to better illustrate the disclosure. This case is a trunk to trunk connection as far as the GTD-120 system is concerned. The first situation consists of a line to trunk connection.

Figure 2:
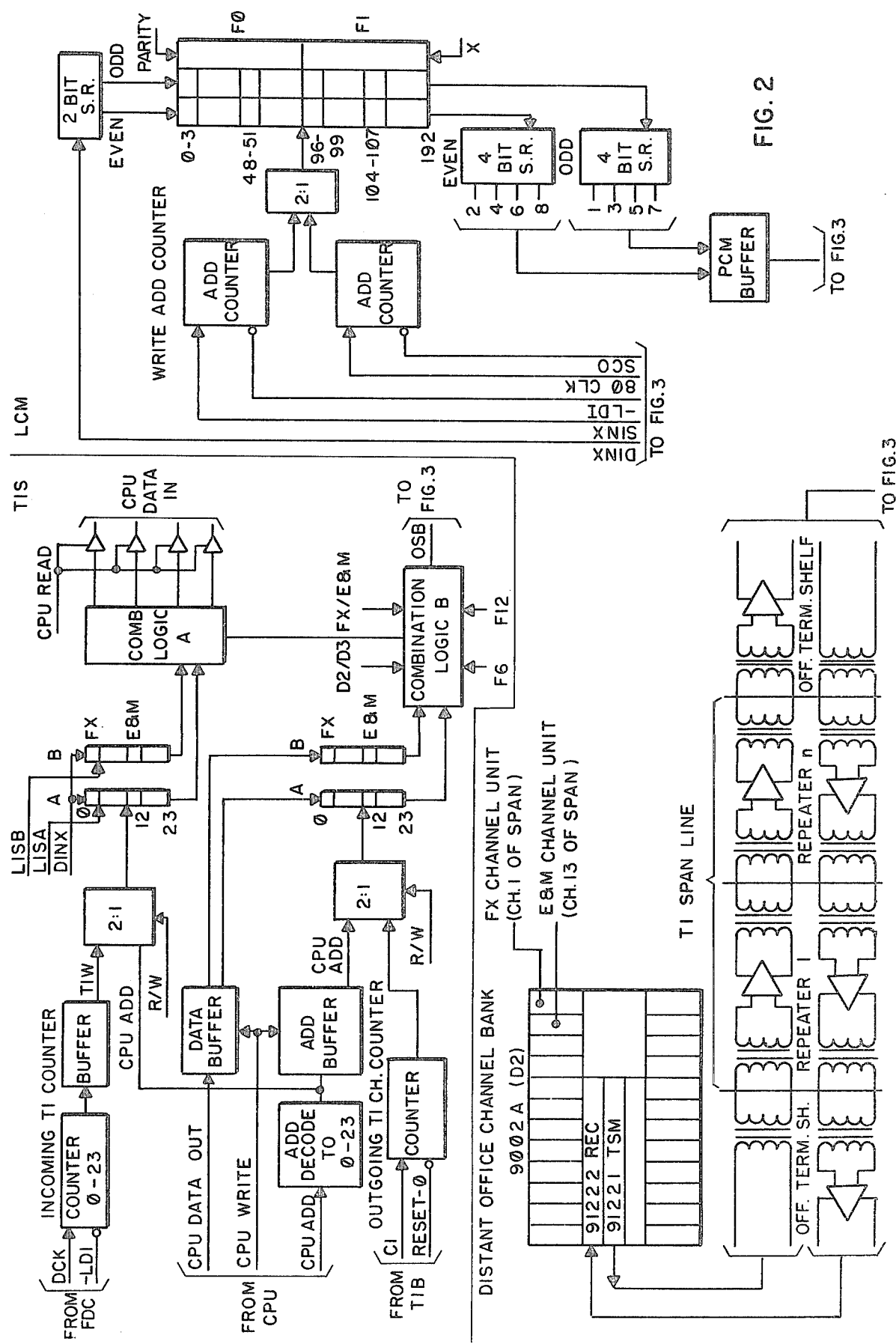
FIGS. 2, 3 and 4 when arranged with FIG. 2 at the top and FIGS. 3 and 4 below it is another schematic block diagram as FIG. 1 but in greater detail.
Figure 3:
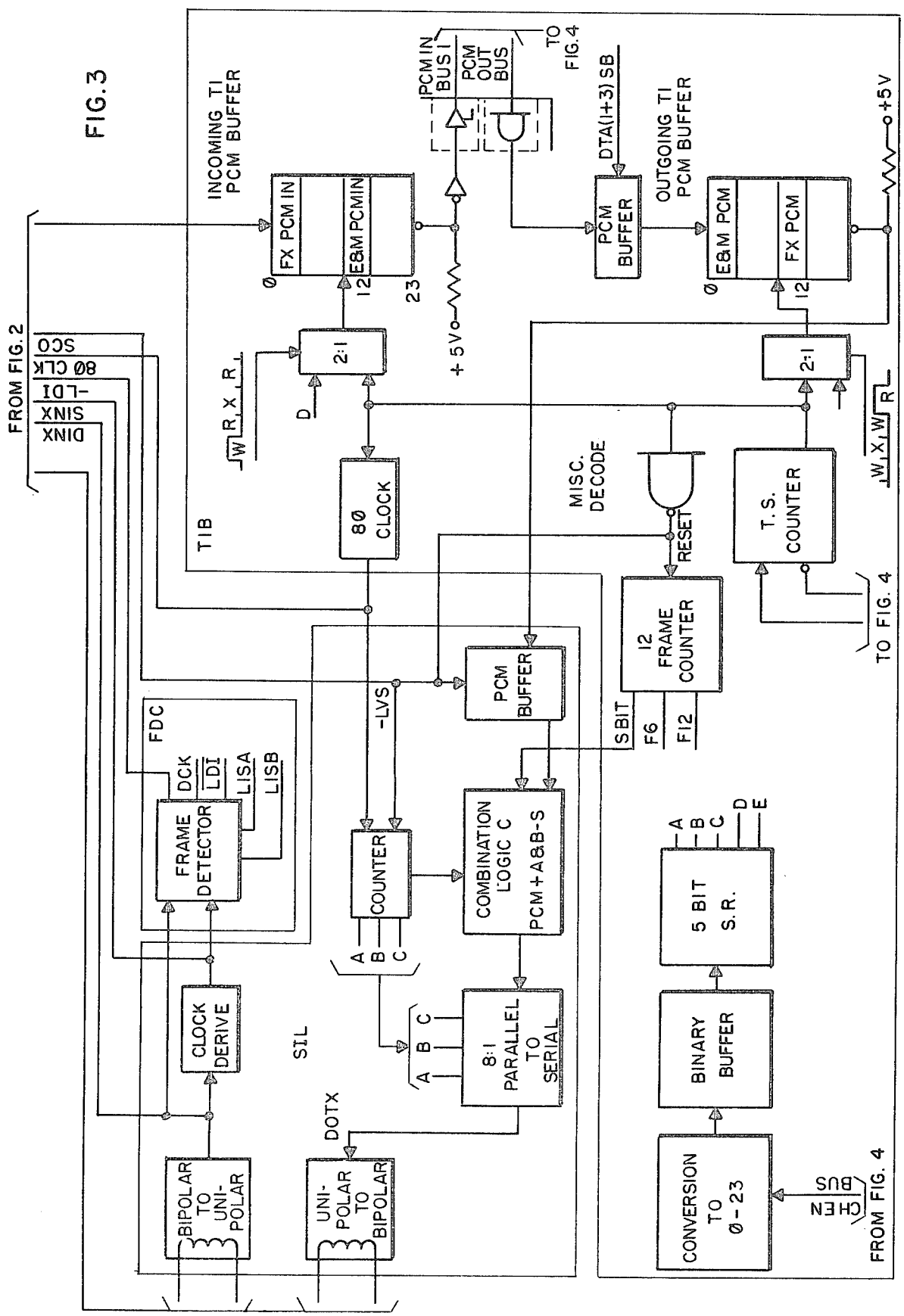
Figure 4:
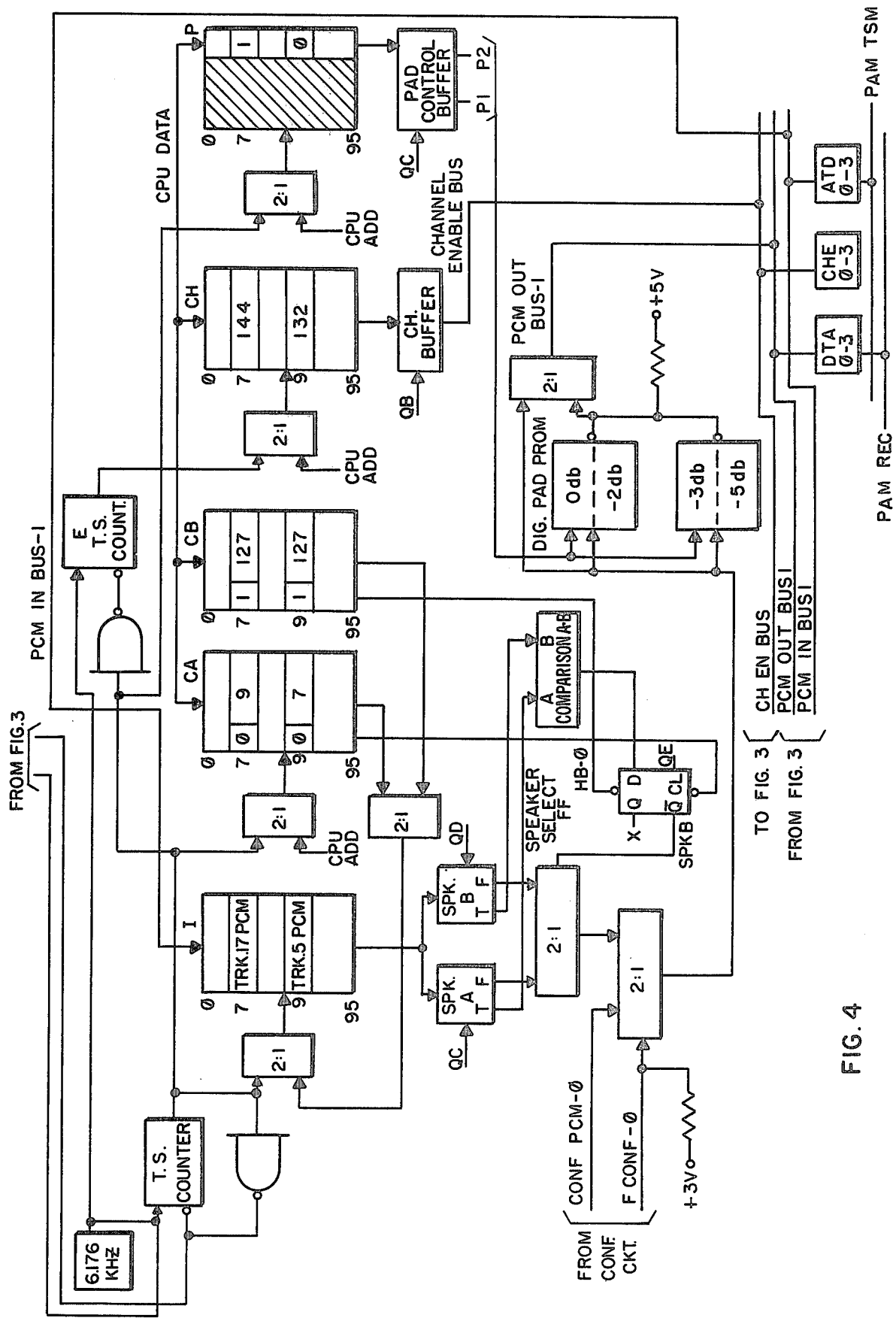
Figure 5:
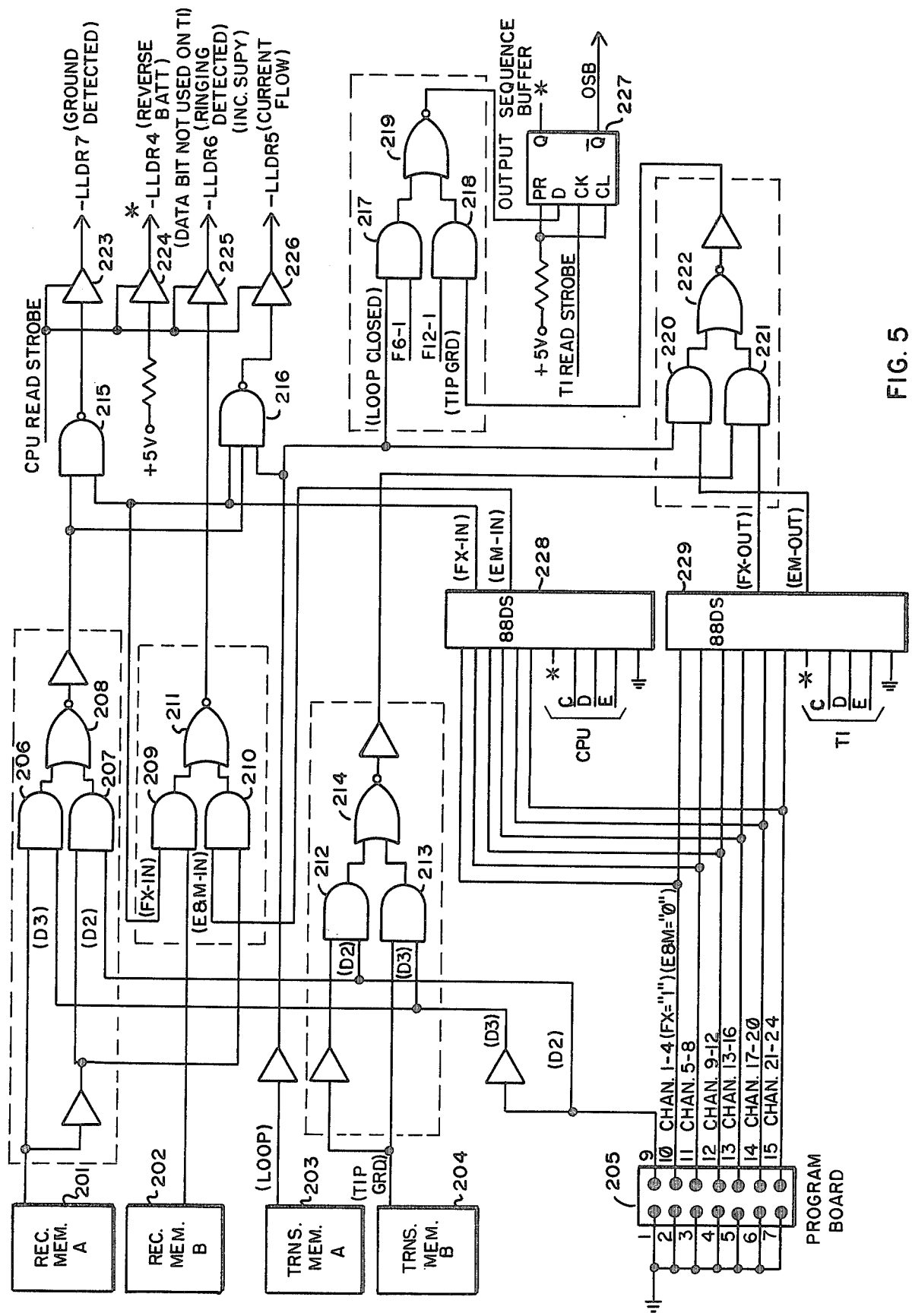
FIG. 5 is a schematic abstract from the trunk supervisory circuit showing the logic for analyzing and coding the trunk types.
Figure 6:
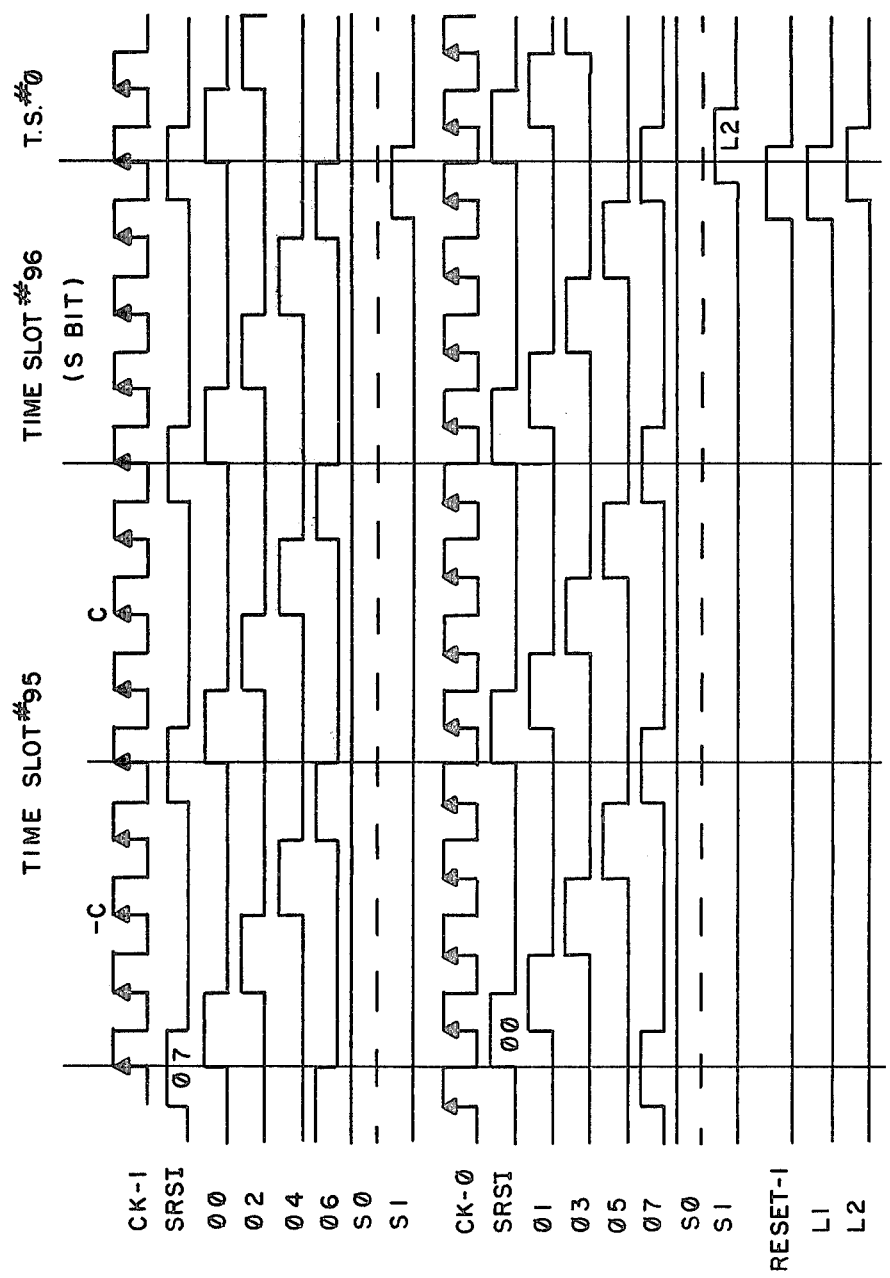
Figure 7:
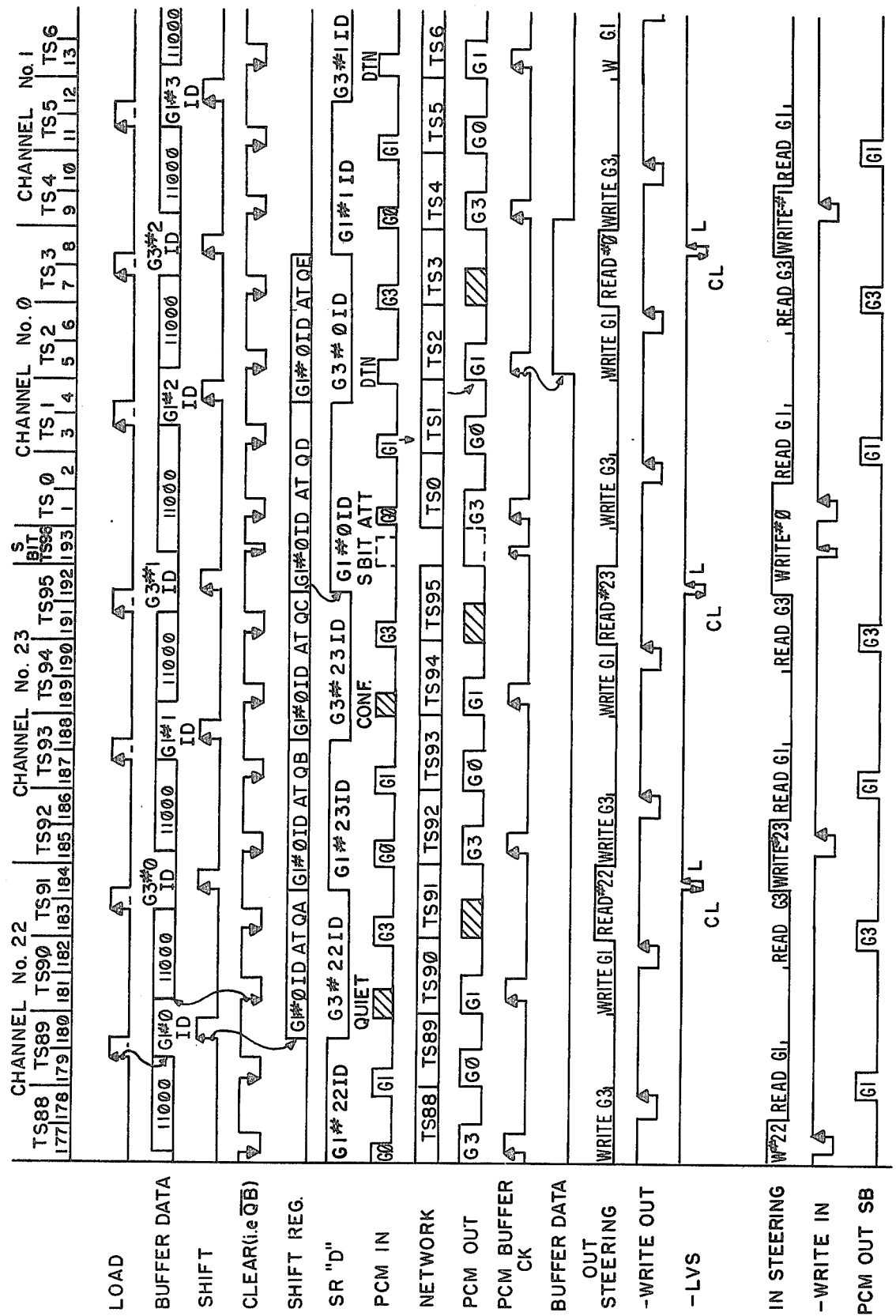

Description (FIGS. 2, 3 and 4) the detailed block diagram in these figures shows the basic GTD-120 system to the right and the Distant office channel bank to the lower left. In the upper left of FIG. 2 is the T1 supervisory circuit T1S. To the right is the line compensation module LCM, the frame detector circuit FDC and finally the span interface circuit SIL on the lower center of FIG. 3. The T1 buffer T1B is on the right side of FIG. 3.

This block diagram is also arranged to show a trunk to trunk call through the GTD-120 system using the T1 option and Distant office channel bank. The distant office will use channel unit 1 to be a foreign exchange (FX) channel unit and channel unit 13 to be an E&M type channel unit. This defines the span channels to be used in this connection. Thus the GTD-120 system must allow channel 1 and channel 13 of the span to be time switched in the GTD-120 system to allow for the interchange of PCM codes for a conversation to exist between subscribers using the FX and E&M channel units. The GTD-120 system will recognize channel 1 of the span as digital trunk location 0 or analog trunk #5 which corresponds to identity 132. The GTD-120 system will recognize channel 13 of the span as digital trunk location 12 or analog trunk #17 which corresponds to identity 144. The digital trunk locations number zero through 23 in the T1 associated circuits. The analog trunk's number 128 through 155 of which 132 through 155 correspond to digital locations 0 through 23 in the T1 associated circuits and channels 1 through 24 on the T1 span.

It is also a requirement that the first twelve digital trunks be assigned channels in group 1 of the GTD-120 network because of the physical location of the associated analog trunks (i.e. Identities 132-143). Likewise, the second twelve digital trunks must be assigned channels in group 3 of the GTD-120 network because of the physical location of the associated analog trunks (i.e. Identities 144-155).

The distant end office will provide voice coded samples of both distant subscribers over the span in fixed channels. These channels correspond to the associated distant channel units. The supervisory status of each circuit (i.e. idle seizure, ringing, etc.) will also be included in these channels according to the standard D2 or D3 formatting. This standard formatting is first divided into frames and channels. A frame is considered as 24 eight bit channels and one framing bit for a total of 193 bits per frame.

The supervisory frames are further defined as supervisory "Channel A" which occurs on the 6th frame and supervisory "Channel B" which occurs on the 12th frame. The data value during "Channel A" will be different than that of "Channel B" if the decode is for a "Foreign Exchange" (FX) ground start channel compared to an E&M supervisory channel.

FOREIGN EXCHANGE (FX) GROUND START SIGNALLING the foreign Exchange ground start channel signalling, when receiving data from the far end during supervisory "Channel A" time will receive "TIP GROUND" present or absent data. When receiving data from the far end during Supervisory "Channel B" time it contains "RINGING" present or absent information.

Transmitting data to the far end from the GTD-120 during supervisory "Channel A" time (F6-1) is the "LOOP" closed or open information. During supervisory "Channel B" time (F12-1) "RING GROUND" or "RING OPEN" data is transmitted. The difference between the D2 and D3 formats is that during Receive "Channel A" and Transmit "Channel B" the data bits are inverted. (See Table A).

TABLE A

| | (SIGNALLING FORMAT) | | | |
|---|---|---|---|---|
| | D3 | | D2 | |
| TRANSMIT | CH-A (F6-1) (OSB) | CH-B (F12-1) (OSB) | CHA (F6-1) (OSB) | CHB (F12-1) (OSB) |
| Ring Open | — | 1 | — | 0 |
| Ring ground | — | 0 | — | 1 |
| Loop Open | 0 | — | 0 | — |
| Loop Closed | 1 | — | 1 | — |
| RECEIVE | CH-A | CH-B | CH-A | CH-B |
| Tip Open | 1 | — | 0 | — |
| Tip grd | 0 | — | 1 | — |
| No ring | — | 1 | — | 1 |
| Ringing | — | 0 | — | 0 |

NOTE:
Receive data in the Table A reflects the true value of the span, the data stored in Receive Memories A & B are the inverse of these values.
Transmit data reflects the data value at the output sequence buffer (OSB) and is the true value of the span.

E & M SIGNALLING

The supervisory signalling of the E & M channel differs from the FX ground start channel in that Channel A Channel B both carry the same value. The data represents an "ON-HOOK" or "OFF-HOOK" condition at either end. The Receive Memory A & B both store the same value during their respective channel times, the data is read at Receive "Memory A" only. (See Table B).

TABLE B

| | (SIGNALLING FORMAT) | | | |
|---|---|---|---|---|
| | D2 | | D3 | |
| RECEIVE | CH-A | CH-B | CH-A | CH-B |
| On-Hook | 0 | 0 | 0 | 0 |
| Off-Hook | 1 | 1 | 1 | 1 |
| TRANSMIT | CH-A (F6-1) (OSB) | CH-B (F12-1) (OSB) | CH-A (F6-1) (OSB) | CH-B (F12-1) (OSB) |
| On-Hook | 0 | 0 | 0 | 0 |
| Off-Hook | 1 | 1 | 1 | 1 |

NOTE:
Receive data in Table B reflects the true value of the span, the data stored in Receive Memories A & B are the inverse of these values.
Transmit data reflects the data value at the output sequence buffer (OSB) and is the true value of the span.

In both Tables A & B the Transmit Memories contain a value of "0" when a function is being performed such as "TIP Grounded", "Loop closed" or "Off-hook".

Network Operations (FIG. 2)

Assuming that the FX trunk, is channel Unit 1 and thus T1 span channel 1 as well as digital trunk location 0 of the T1 circuits, is assigned channel 2 of Group 1 in the GTD-120 network or Time Slot 9(00010-01). Assuming also, that the E&M trunk, which is channel Unit 13 and thus T1 span channel 13 as well as digital trunk location 12 of the T1 circuits, is assigned channel 1 of Group 3 in the GTD-120 network or Time Slot 7 (00001-11). This is defined by the placement of Identity 132 in time slot location 9 of the network memory CH and identity 144 in time slot location 7 of the network memory CH, respectively. This operation will allow the T1B to detect the digital trunk identity via the bus CHE. The "Time switching" or PCM interchange is accomplished by placing time slot 9 into the time slot 7 location of the CA memory and time slot 7 into the time slot 9 location of the CA memory. The trunk to trunk connection has been established. This example also allows for Pad 1 (−2 db) on time slot 7 PCM or what the E&M trunk hears and Pad 0 (0 db) on time slot 9 PCM or what the FX trunk hears. This use of the pads is not important to the discussion since it only controls the levels of transmission.

The above stated connection will result in a trunk to trunk connection existing until the network memories are cleared by the CPU. This will occur when the CPU has sensed the trunk release via the interface T1S. It should be pointed out that the Distant end office channel bank, SIL, LCM and FDC are continually transmitting T1 span data regardless of the network connection. The T1 S and T1 B incoming T1 buffers are also loaded every frame and the outgoing T1 buffers outputted to the span every frame. The T1S incoming T1 buffer locations will be read as the trunk scan program accesses digital trunks and the T1S outgoing T1 buffer will be loaded when the CPU wants to control a digital trunk (for seizure, pulsing, etc.). The T1S incoming T1 buffer is only read and T1S outgoing T1 buffer is only written while the associated digital trunk identity for the respective memory location exists in the channel memory CH.

The following sequence of events will occur for the previously stated connection:

During every frame the distant office channel bank codes all 24 channels to correspond to the respective channel units. The signalling bits are stuffed into the least significant bit during frame 6 (A bit) and frame 12 (B bit). The meaning of these signalling bits varies with channel unit type and D2 or D3 format. Both ends of the span must use the same signalling format for each channel. In this case, channel 1 will be FX signalling and channel 13 will be E&M. Non-equipped channel units will still result in data being sent over the span since the channel bank common equipment operates the same every channel. The S bit is also provided every frame and will allow the frame detector (FDC) to synchronize to the incoming T1 span data stream and recognize frame 6 and 12.

A stream of 193 bits per frame is sent to the span interface (SIL) via the T1 span line. The span will be made up of N repeaters depending upon the physical length. The span must terminate on an office terminating shelf (which includes a final repeater) before entering the SIL.

The SIL converts the span line bipolar data to unipolar data (DINX) and derives a strobe signal SINX.

The frame detector (FDC) uses SINX to strobe DINX and monitors the serial data stream for the S bit. This is recognized by the toggling bit pattern every other frame. This is known as the terminal framing pattern (TF), once the S bit is located the signalling framing pattern (SF) is available to show the signalling frames. This is accomplished by monitoring the SF pattern for transitions. While "in frame" the FDC forwards the load data in (LDI) signal to the LCM to synchronize its write address counter. This is done by clearing it when the S bit occurs and clocking it from SINX. The digit check (DCK) signal is forwarded to the T1S along with LDI. Since DCK occurs every channel to indicate bit 2 for alarm checking by bit 2 suppression at the distant end, it is used by the T1S to clock its incoming T1 channel counter. The LD1 signal synchronizes the counter to the S bit. The load incoming supervision bit A (LISA) and load incoming supervision bit B (LISB) occur during the supervision bit of every channel for frame 6 and 12, respectively. These then allow the T1S to know which DINX bits are A and B bits, respectively, and since the Incoming T1 channel counter is synchronized as well as DINX to the S bit via LDI control, the incoming T1 buffer can store the received A and B span signals.

The line compensator (LCM) stores the incoming T1 span data (DINX) into its two frame buffer. This is done using the write address counter which is synchronized to the S bit via the LDI signal and increments one count for every SINX pulse. The memory actually stores two bits in 96 locations for the first frame and also a parity bit. The second frame stores another array of two bits for 96 locations giving a total of 192 locations. This two frame buffer allows for writing in one frame buffer while reading from the second. The read address counter is controlled by the T1B signal send channel zero (SC0) and increments from an eight phase clock which cycles every 648 nanoseconds or 193 times every frame. This allows the read function to be synchronized to the network clock. It should be noted that the read and write addresses of the LCM will shift with respect to each other due to span jitter and temperature variations but, the line compensator is able to compensate using the two frame buffer and its read/write control logic. The method used to achieve this is not important and will not be discussed here. The output to the T1B must be in eight bit parallel data format occurring every channel so, a four bit shift register two bits wide is used to store each channel data and once shifted in completely it is transferred to a PCM buffer at the end of the channel (i.e. after the fourth shift).

The T1B now, using the LCM PCM Buffer output loads its incoming T1 buffer. Location zero will then contain the first word received from the span and is the PCM code generated from the FX channel unit in the distant office channel bank. Likewise, location 12 contains the E&M channel units PCM code which was channel 13 of the span. The incoming T1 buffer of the T1B will always contain the span PCM code for every channel regardless of network connections. If all channels are idle, the buffer will contain idle channel PCM code.

The identity of the E&M trunk (144) will be read out of the network CH memory two channels early according to the address of early counter. This will be converted to a zero to 23 binary address, stored in a binary buffer and finally put into a five bit shift register which is 5 bits wide. This is done via the CHE bus of the basic GTD120 by the T1B and results in this case of 144 being converted to 12. The shift register shifts twice each channel or only during group 1 or 3 time slots since this is the only position which a digital trunk identity may reside in the channel memory CH. After four shifts or two channels the D output of the shift register will show the previously loaded 12. The PCM code of the E&M channel unit will now be outputted onto the network PCM IN BUS and stored in time slot location seven.

The CA address of time slot 7 contains time slot 9 and will result in the FX PCM code stored last frame (this is described in a following paragraph) being first stored in the speaker A latch and finally outputted on the PCM OUT BUS. Note that the network P memory has pad value of 1 which corresponds to the −2 db pad. Thus, the outputted PCM will be reduced 2 db by the network PROM table lookup. Also, note that the hold bit in the CB memory overrides the comparison logic of the network forcing the selection of speaker A and that the force conference signal (FCONF-0) is inactive. This time switching operation take one time slot or one quarter of a channel in the GTD-120 system.

The T1B shift register has again shifted and the shift register E output contains the 12. This allows the PCM OUT BUS data to be stored in location 12 of the outgoing T1 buffer. It should be noted that no writing will occur once the identity 144 is removed from memory CH and whatever was last written into location 12 will remain until identity 144 again appears somewhere in the CH memory (of course only in Group 3 time slots).

Two time slots latter the identity of the FX trunk (132) was read from the CH memory and converted to zero by the T1B. It then follows the converted identity of the E&M trunk (12), in the shift register since only every other time slot causes a load and shift. While the 12 is at position E the 0 is at position D which allows the PCM code of the FX channel unit to be outputted to the network PCM IN BUS and stored in time slot location nine. There is a delay between the two bus outputs since they are controlled by the group 1 and 3 network PCM out strobes. Thus, the group 2 strobe will allow PCM to be loaded in time slot 8. Also, the normal analog to digital converter output during digital trunk time slots is disabled by routing these signal via the T1B which blocks the pulse whenever it outputs PCM to the bus.

The CA address of time slot 9 contains time slot 7 and results in the E&M PCM code just stored during time slot 7 being sent out on the PCM OUT BUS. Again, the speaker A buffer is steered out excluding the conference but, now Pad 0 is enabled so no conversion occurs. The two PCM codes have been "time switched" since the code of time slot 7 has been sent to time slot 9 and that of time slot 9 has been sent to 7. This occurring every frame allows conversation to be exchanged between the E&M and FX channel units.

The T1B shift register again shifts and register E output contains the 0. This allows the PCM OUT BUS data to be stored in location 0 of the outgoing T1 buffer. It is apparent that this operation will cease occurring every frame once identity 132 is removed from the CH memory. It is also apparent that if identity 132 were to be written into time slot 5 instead of 9 that the PCM for the FX channel unit will still be stored in location 0 of the T1 buffer due to the connection logic. That is, it is not location dependent on the CH memory assignment, but it is time dependent since in the case of a time slot 5 assignment the time switching process will occur four time slots or one channel earlier for the FX channel unit. Its identity would in this case preceed that of the E&M channel unit in the T1B shift register.

The reading of the outgoing T1 buffer of the T1B is controlled by a time slot counter which is slaved to the network time slot counter. This counter also drives the eight phase clock which the LCM & SIL require as well as a 12 frame counter. The 12 frame counter generates the frame 6 and frame 12 indications to the T1S to request the A and B outgoing signalling bits, respectively. It also generates the outgoing S bit pattern for the distant office channel bank synchronization to the T1 span data stream it receives. The T1S also is given a channel pulse (C1) to run its outgoing T1channel counter and a frame resent (RESET-0) signal to synchronize it. The result of all these things is that the outgoing span will be synchronized to the T1B counters, and thus to the GTD-120 network clock. The output of the outgoing T1 PCM buffer is sequentially sent in eight bit parallel to the SIL and load with the signal load voice sample (LVS).

The CPU reads the T1S Incoming T1A/B buffer by providing the digital trunk identity which the T1S converts to 0 through 23. The writing of the outgoing T1A/B buffer uses the same conversion since the CPU can only read or write. Then, the FX trunk will be presented by the CPU as 132 and converted to 0 while the E&M trunk will be presented as 144 and converted to 12. The outgoing T1 A/B Buffer always contains the last data written to that trunk location by the CPU. The CPU read and write operations are controlled by the GTD-120 software program.

The outgoing T1A Buffer is read during frame 6 sequentially according to the outgoing T1 channel counter of the T1S. Likewise, the B buffer is read during frame 12. The common output of A or B data is presented to the SIL as the outgoing supervisory bit signal (OSB).

The SIL receives the PCM code and S bit from the T1B and the OSB signal from the T1S along with the LVS signal. It also receives the eight phase clock outputs and using LVS as a synchronization signal counts the eight phase clock in a counter. The SIL combinational logic converts the data to the proper span format and then uses the counter to convert to serial. The serial unipolar data stream DOTX is then converted to bipolar. The bipolar stream is then sent to the distant office channel bank via the T1 span line. The SIL combinational logic senses the S bit by noting that its counter counts on extra count between LVS signals. It stuffs the A bits (OSB) into the least significant bit of every channel during frame 6 and the B bits (OSB) into the lease significant bit of every channel during frame 12.

The channel bank receive common senses the S bit and extracts the A&B bits of every channel. It has a channel counter running off its clock drive to distribute the A and B bits to the correct channel unit and converts the PCM codes to PAM. The PAM is then converted to analog by the respective channel unit.

RECEIVING AND DECODING OF DATA ON CHANNEL A & B (FIG. 5)

The status of the T1 supervisory circuit Receive Memory A & B data for all 24 channels is continuously being updated every 125 micro-seconds by the incoming data from the span. The GTD-120 Central Processor scans sense points −LLDR4 thru −LLDR7 by addressing the Receives Memories via a 5 bit address and by enabling the tri-state buffers (223, 224, 225 and 226) via the CPV read strobe.

The data read from the Receive Memories A (201) & B (202) is conditioned to the proper format expected by the processor complex by gates 206–210 and 215 and 216. The steering logic is controlled by the eight bit data selector multiplexor 228 for reading data out of the Receive Memories A & B (201 and 202). The last 3 bits of the 5 bit CPV channel read address are used to decode the eight bit data selector input lead from the manual program board 205. Each input lead from the program board decodes the supervisory status for four consecutive channel addresses. This grouping is for convenience only since should it be required each individual trunk address could be coded.

The signalling format is pre-set for all 24 channels and is decoded as of the "D2" type if no shorting pin is inserted between pins 1 and 9 of the program board.

Gates 206, 207 and 208 provide the data steering based on the format, if the format is "D2" gate 207 inverts the receive Memory A (201) data to the input of gate 215.

Gates 209, 210 and 211 are conditioned by the eight bit data selector to read Receive Memory B (202) data if it decodes an "FX-IN" mode. If the mode is E & M signalling, steering gate 210 steers the inverted data from Receive Memory A (201).

Gate 215 Ands the ground detected signal from Receive Memory A (201) with the "FX-IN" command to the tri-state sense point −LLDR7 via gate 223 to be read by the Central Processor.

The Central Processor will read and is interested in data bits "−LLDR4" thru "−LLDR7" for trunk circuits that are of the FX loop or ground start type. If the mode of incoming supervision is of the E & M type gates 215 and 216 inhibit data sense points "−LLDR7" and "−LLDR5", respectively. Sense point "−LLDR4" is unused in either FX loop or ground start or E & M T1 interface, this leaves "−LLDR6" as the incoming supervision sense point.

Conditioning and Transmitting of Data to the Far End Office

The Central Processor writes the data instructions into Transmit Memories A & B (203, 204). The data is read out of the Transmit Memories A & B (203 and 204) during the decoded Channel address from the read cycle of the T1 span. Again, the last 3 bits of the 5 bit T1 read channel address are used to decode gate 229 which in turn reads the status for the group of four channel identities from the Program board.

Gate 229 decodes the mode of supervision to be transmitted to the far end office. Gates 212, 213 and 214 provide data steering based on the signalling format, in the event of a D2 format the data read from Transmit Memory B (204) is inverted to the input of Gate 212.

Gates 220, 221 and 222 provide data steering depending on the signalling type. If the signalling is FX loop or ground start they pass data read from Transmit Memory B 204. If the decode is for E & M supervision, data from Transmit Memory B (204) is blocked at gate 221 and data from Transmit Memory A (203) is forwarded to the multiplexor steering gate 217.

Gate 217 multiplexes data from Transmit Memory A during "F6-1" time or "Channel A" data from either Transmit Memory B (204) or "Memory A" (203) during "F12-1" time or "Channel B".

Output sequence buffer 227 facilitates the interface to the span interface card.

Gate 216 provide the logic to simulate a current flow signal to sense point "−LLDR5", the current flow signal is a function of being in the FX loop or ground start signalling mode and having transmitted a loop closure signal to the far end and having received a "ground detected" signal from the far end office. These two conditions plus the transmitting of a loop closure signal to the far end office are the requirements to simulate current flow. During the Central Processor read cycle both the Receive and Transmit memories are enabled, since the span data to determine current flow are in Receive Memory A and in Transmit Memory A.

While a preferred embodiment of the apparatus and method provided by the present invention has been described, various modifications may be made without departing from the invention as defined in the appended claims.

What is claimed is:

1. In a pulse code modulated control processor controlled time division communication switching system, a universal interface arrangement for the conversion of supervisory data from a first format utilized by a multichannel carrier system to a second format utilized by said switching system and comprising:

a first memory arranged to receive and store supervisory data incoming from said carrier system and including an output means, coding means having an output indicating the type of format utilized by said carrier system and also the supervisory format required by the trunks connected via said channels of said carrier systems;

a plurality of sense points accessable by said central processor, a logic means connected to said coding means output and said first memory means output, responsive to said outputs to mark said sense points to indicate in proper format to said processor the incoming supervisory data.

2. In a pulse code modulated central processor controlled time division communication switching system as claimed in claim 1, wherein: said universal interface arrangement further includes a second memory arranged to receive data prior to transmission and said carrier system, and having an output means and second logic means connected to said coding means output and said second memory output means and responsive to said outputs to output to said carrier system in the required format.

3. In a pulse code modulated central processor controlled time division communication switching system as claimed in claim 2, wherein: said carrier system is a T1 carrier system of 24 channels.

4. In a pulse code modulated central processor controlled time division communication switching system as claimed in claim 3, wherein: said coding means comprises a program board having means to ground mark the output corresponding to the trunks connected via said channels of said carrier system.

5. In a pulse code modulated central processor controlled time division communication switching system as claimed in claim 4, wherein: at least one of said supervisory data of said carrier systems is formatted into a first frame and other of said supervisory data is formatted into a second frame, whereby said first and second memories are divided each into a first and a second part to receive said corresponding frames of data.

6. In a pulse code modulated central processor controlled time division communication switching system as claimed in claim 5, wherein: said data is read from said carrier system by said central processor addressing a particular channel and said logic means further includes an arrangement operated in response to said address to code said incoming supervisory data only during the presence of said address.

7. In a pulse code modulated central processor controlled time division communication switching system as claimed in claim 6, wherein: said data is read from said second memory by said carrier system addressing a particular channel; and said logic means further includes an arrangement operated in response to said addressing of a particular channel to code said outgoing supervisory information for that channel only during the presence of said address.

* * * * *